(12) United States Patent
Lu

(10) Patent No.: US 7,480,926 B2
(45) Date of Patent: Jan. 20, 2009

(54) DEVIATION ADJUSTMENT MECHANISM FOR SPINDLE MOTOR AND PICKUP HEAD OF OPTICAL DISK DRIVES

(75) Inventor: Yi-Wei Lu, Taipei (TW)

(73) Assignee: Micro-Star Int'l Co., Ltd., Taipei (TW)

( * ) Notice: Subject to any disclaimer, the term of this patent is extended or adjusted under 35 U.S.C. 154(b) by 524 days.

(21) Appl. No.: 10/864,406

(22) Filed: Jun. 10, 2004

(65) Prior Publication Data

US 2004/0268374 A1 Dec. 30, 2004

(30) Foreign Application Priority Data

Jun. 30, 2003 (TW) .............................. 92212023 U

(51) Int. Cl.
*G11B 17/028* (2006.01)
(52) U.S. Cl. .................. 720/697; 720/695; 720/696; 720/700; 720/704; 720/717
(58) Field of Classification Search ......... 720/695–697, 720/700, 704, 717
See application file for complete search history.

(56) References Cited

U.S. PATENT DOCUMENTS

| 3,651,501 | A | * | 3/1972 | Cote ............................ 360/75 |
| 5,737,293 | A | * | 4/1998 | Kawamura et al. .......... 720/628 |
| 5,867,471 | A | * | 2/1999 | Kim et al. .................... 720/697 |
| 6,014,362 | A | * | 1/2000 | Park ............................ 720/697 |
| 7,016,283 | B2 | * | 3/2006 | Yang et al. .................. 369/53.3 |

* cited by examiner

*Primary Examiner*—Andrea L Wellington
*Assistant Examiner*—Carlos E Garcia
(74) *Attorney, Agent, or Firm*—Harness, Dickey & Pierce

(57) ABSTRACT

A deviation adjustment mechanism for spindle motor and pickup head of optical disk drives includes an optical disk drive dock for holding a pickup head and a motor holding seat for holding a spindle motor. The motor holding seat has a retaining flange on one edge. The optical disk drive dock and the motor holding seat are connected by an elastic element to move the motor holding seat in one direction in normal conditions. An adjusting member is provided to press the retaining flange to move the motor holding seat towards another side to adjust the deviation of the spindle motor and the pickup head of the optical disk drive.

9 Claims, 5 Drawing Sheets

DEVIATION ADJUSTMENT MECHANISM FOR SPINDLE MOTOR AND PICKUP HEAD OF OPTICAL DISK DRIVES

FIELD OF THE INVENTION

The present invention relates to a deviation adjustment mechanism adopted for use on optical disk drives and particularly to an adjustment mechanism for adjusting the deviation between the spindle motor and pickup head of optical disk drives.

BACKGROUND OF THE INVENTION

With the advance of technologies, the optical disk drive has become a well-accepted product to the general public. And with the information industry flourishing tremendously in recent years, the optical disk drive has become an indispensable product. For instance CD-ROM, DVD-ROM, and the like are very popular these days, and the technology is well developed.

At present, many optical disk drives have three light beams to perform server track control for the pickup head. A main light beam is used to read the data on the optical disk, and two secondary light beams are on two sides to correct the position of the main light beam. As the spindle motor and pickup head of the optical disk drive consist of many components, when these components are assembled, fabrication allowances of the individual components and the tolerance of the final assembly often result in a deviation between the spindle of the pickup head and the center of the optical disk. This deviation affects the positions of the two secondary light beams projecting on the optical disk. As the optical media density increases constantly, the interval of data tracks becomes narrower, and accurate control of the deviation becomes very important.

Refer to FIGS. 1 and 2 for conditions that have no deviation and a deviation between the spindle motor and pickup head of the optical disk drive, for a main light beam 10 and two secondary light beams 20 projecting on an optical disk track 30.

FIG. 1 illustrates the condition in which there is no deviation between the center of the optical disk and the pickup head. The main light beam 10 accurately projects in the center of the track 30 without any deviation.

FIG. 2 illustrates a condition in which the spindle motor deviates leftwards or rightwards. The relative positions of the track 30 and the three light beam spots on the optical disk are affected. The main light beam 10 moves away from the track 30, while the secondary light beams 20 move close to the track 30. As a result, the accuracy of the main light beam 10 of the pickup head to read data is affected, and the stability of the server track of the optical disk drive is reduced.

SUMMARY OF THE INVENTION

In view of the foregoing problems occurring to conventional techniques, the object of the invention is to provide a deviation adjustment mechanism for the spindle motor and pickup head of optical disk drives. The invention mainly includes an optical disk drive dock, a motor holding seat, an elastic element, an adjusting member and an anchor member.

The optical disk drive dock carries a pickup head holding seat for holding the pickup head. The motor holding seat holds the spindle motor and is movably mounted onto the optical disk drive dock. There is a retaining flange located on an edge of the motor holding seat.

The elastic element has one end fastened to the optical disk drive dock, and other end latched on the motor holding seat to generate a reaction force to move the motor holding seat towards the optical disk drive dock in normal condition.

The adjusting member is movably located on the optical disk drive dock corresponding to the retaining flange, to be in contact with the retaining flange when the motor holding seat moves towards the optical disk drive dock in normal condition.

Adjusting the deviation of the spindle motor and the pickup head of the optical disk drive may be accomplished by altering the position of the adjusting member and moving the retaining flange. Therefore the entire motor holding seat may be moved to adjust the deviation of the spindle motor and the pickup head of the optical disk drive.

The anchor member includes an anchor strut located on the optical disk drive dock and a fastening bore formed on the motor holding seat, to connect the motor holding seat and the optical disk drive dock, thereby to fix the relative positions of the motor holding seat and the optical disk drive dock.

The mechanism of the invention uses a simple elastic element and adjusting member to adjust the deviation of the spindle motor and the pickup head of the optical disk drive. The structure is simple and easy to fabricate. It does not increase fabrication cost very much and can improve the server stability of the optical disk drive.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
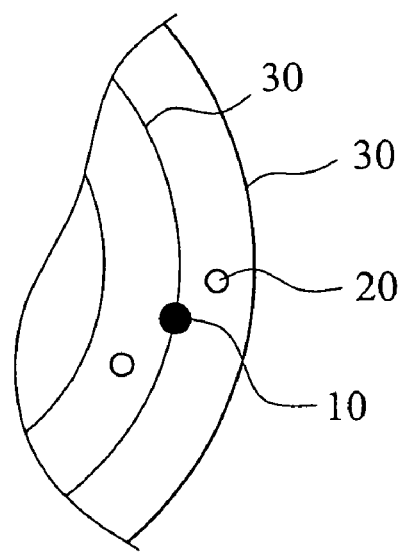
FIG. 1 is a schematic view of the main light beam and two secondary light beams projecting on the track of an optical disk when there is no deviation between the spindle motor and the pickup head of the optical disk drive.
Figure 2:
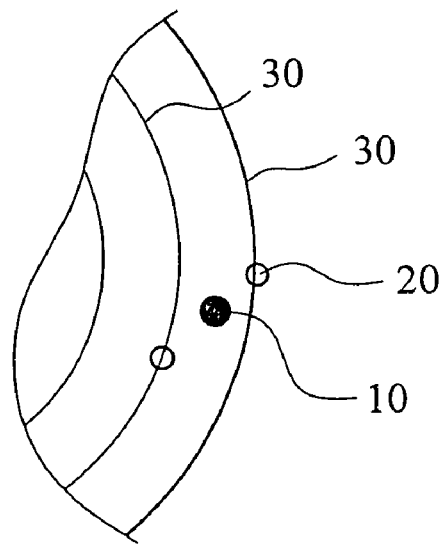
FIG. 2 is a schematic view of the main light beam and two secondary light beams projecting on the track of an optical disk when there is a deviation between the spindle motor and the pickup head of the optical disk drive.
Figure 3:
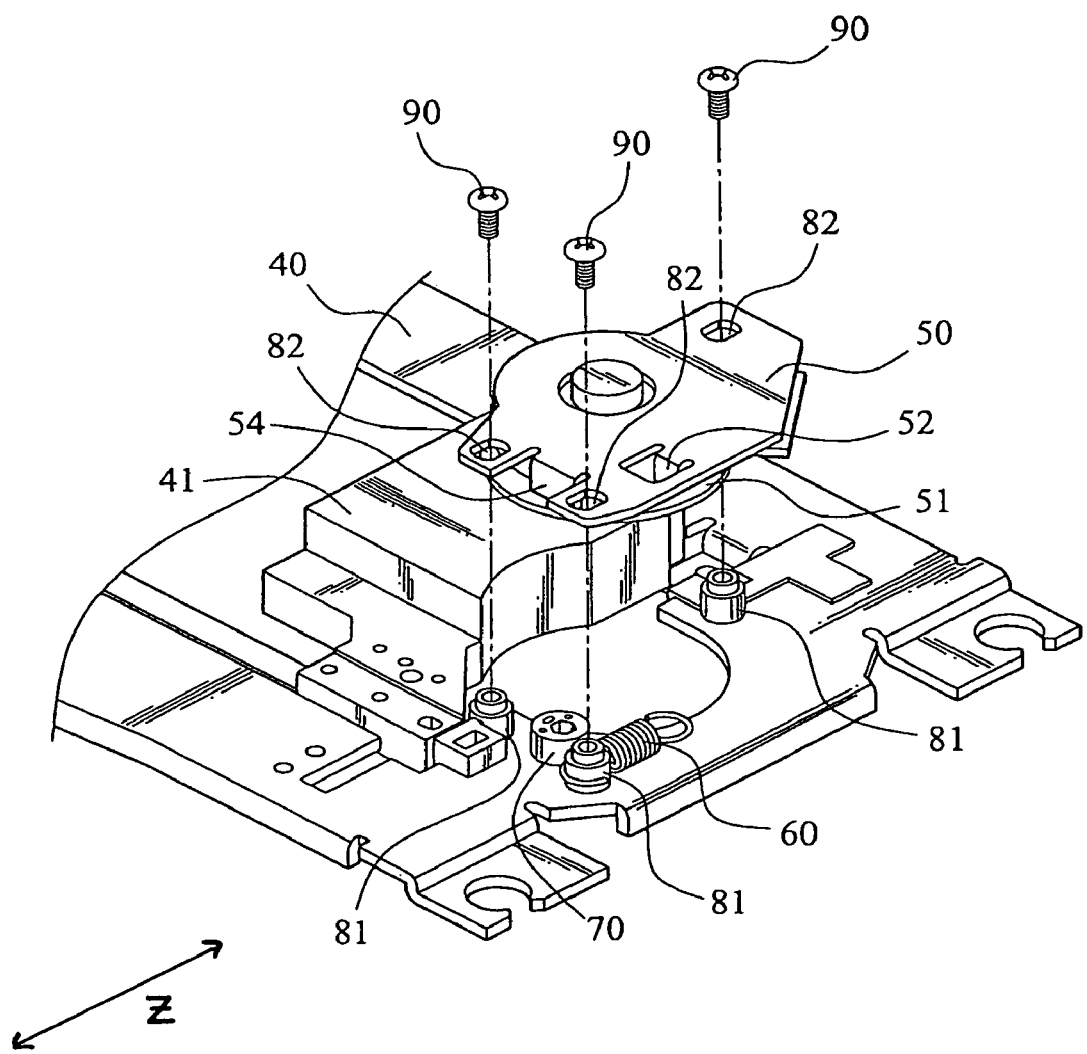
FIG. 3 is a perspective view of a first embodiment of the deviation adjustment mechanism for the spindle motor and pickup head of optical disk drives of the invention.

Refer to FIG. 3 for a first embodiment of the deviation adjustment mechanism of the invention. The mechanism aims to adjust and eliminate the deviation of a spindle motor 51 of an optical disk drive relative to the pickup head (not shown in the drawing) to increase the server stability of the optical disk drive.

The mechanism includes an optical disk drive dock 40, a motor holding seat 50, an elastic element 60, an adjusting member 70 and an anchor member which includes an anchor strut 81 and a fastening bore 82.

The optical disk drive dock 40 carries a pickup head holding seat 41 for holding the pickup head. The pickup head holding seat 41 is movably mounted onto the optical disk drive dock 40 and may change position according to the control of the optical disk drive system.

The motor holding seat 50 holds a spindle motor 51 and is movably mounted onto the optical disk drive dock 40. It further has a latch lug 52 and a retaining flange 54 located on an edge thereof.

The elastic element 60 has one end fastened to an anchor strut 81 on the optical disk drive dock 40 and other end latched on the latch lug 52 of the motor holding seat 50 to generate a reaction force to move the motor holding seat 50 towards a Z-axis direction indicated in the drawing in normal condition. The retaining flange 54 is in contact with the adjusting member 70. The elastic element 60 may be a spring.

For adjusting the moving displacement of the motor holding seat 50 in the Z-axis direction, the adjusting member 70 is movably located on the optical disk drive dock 40 corresponding to the retaining flange 54. By altering the position of the adjusting member 70 the retaining flange 54 may be moved to drive the motor holding seat 50 moving in the Z direction, thereby changing the relative position of the motor holding seat 50 and the optical disk drive dock 40. The adjusting member 70 is a cam with an eccentric hole engageable with a matching wrench (such as a hexagonal wrench or the like) to turn the adjusting member 70 and change the position thereof.

The anchor member is to connect the motor holding seat 50 and the optical disk drive dock 40, to fix the relative position of the motor holding seat 50 and the optical disk drive dock 40. It includes an anchor strut 81 located on the optical disk drive dock 40 and a fastening bore 82 formed on the motor holding seat 50.

The anchor strut 81 located on the optical disk drive dock 40 and the fastening bore 82 formed on the motor holding seat 50 may be fastened through a coupling member 90 so that the relative position of the motor holding seat 50 and the optical disk drive dock 40 may be adjusted as desired. The fastening bore 82 is a slot to be fastened by the coupling member 90 when the optimal position of the motor holding seat 50 has been adjusted and set. The coupling member 90 may be a screw.

To adjust the deviation of the spindle motor of the optical disk drive, put an optical disk on the disk holding mechanism and rotate. A connecting external oscilloscope will indicate track signals. Based on the track signals, the position of the motor holding seat 50 may be adjusted to minimize the deviation of the spindle motor and the pickup head of the optical disk drive.

Figure 4:
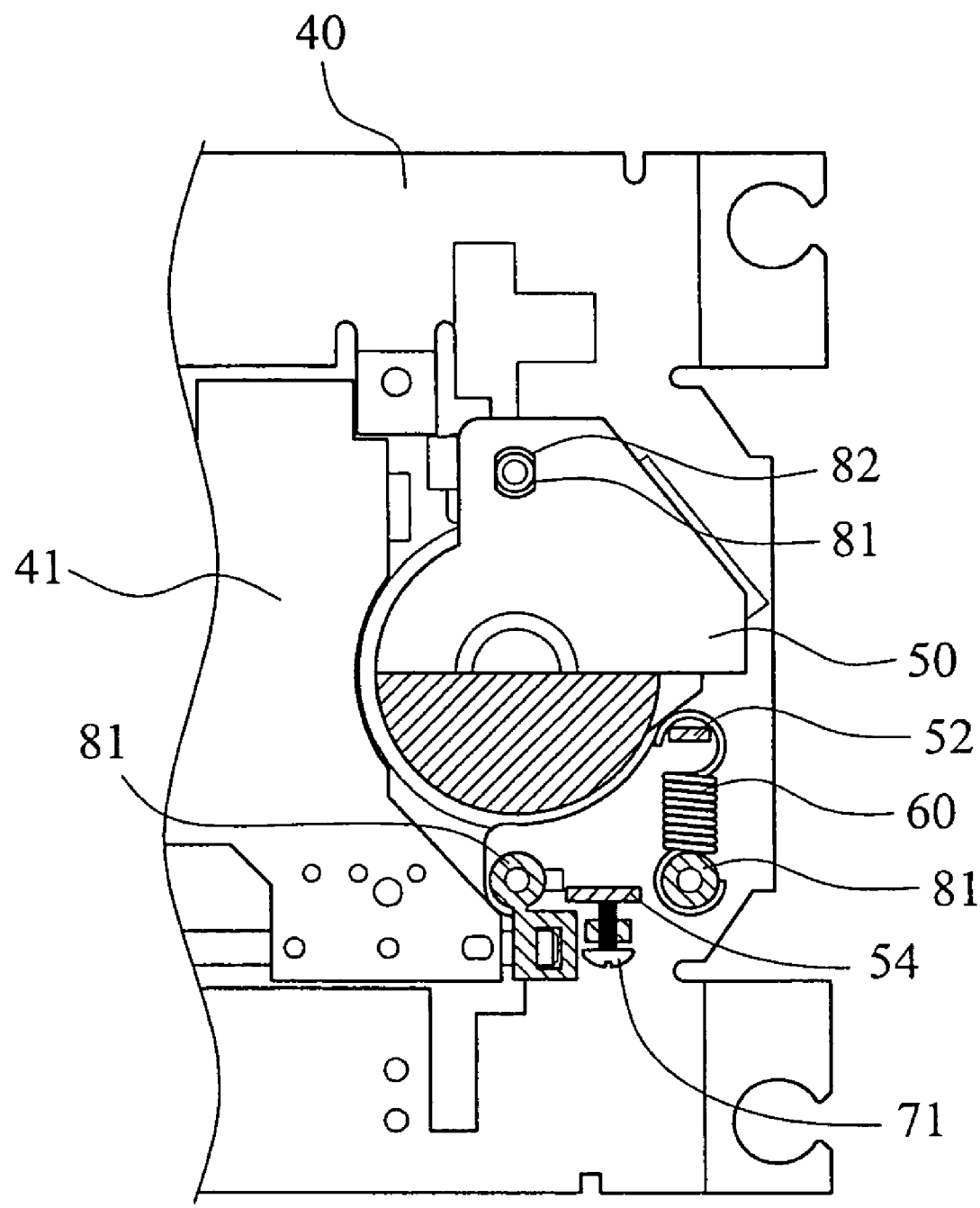
FIG. 4 is a top view of a second embodiment of the deviation adjustment mechanism for the spindle motor and pickup head of optical disk drives of the invention.

Refer to FIG. 4 for a second embodiment of the deviation adjustment mechanism of the invention. The difference of this embodiment from the first embodiment is that the adjusting member 70 in FIG. 3 is replaced by a screw 71 fastened to the motor holding seat 50, that may be turned to move the retaining flange 54 so that the motor holding seat 50 may be moved in the Z-axis direction thereby adjusting the deviation of the spindle motor and the pickup head of the optical disk driver.

Figure 5:
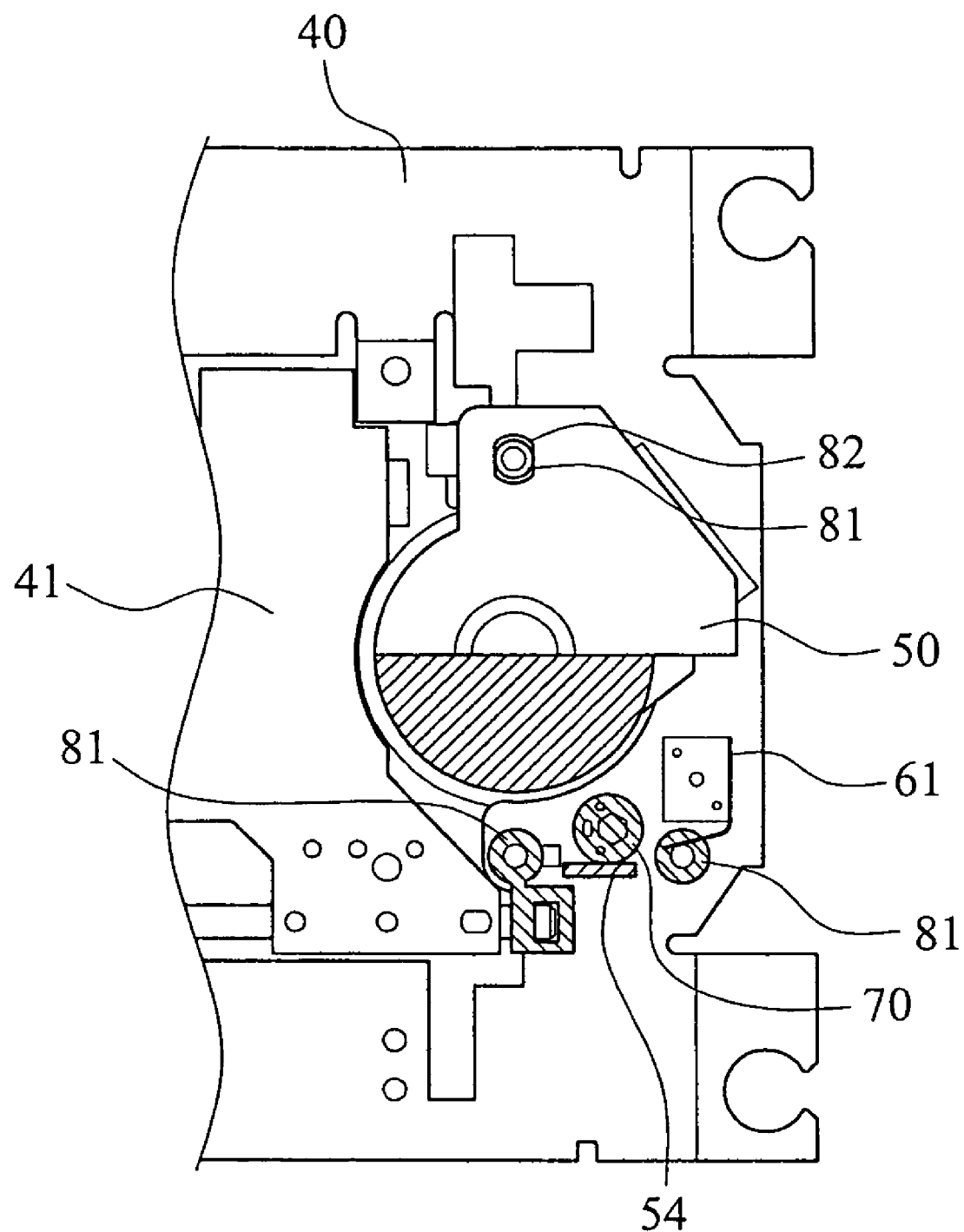
FIG. 5 is a perspective view of a third embodiment of the deviation adjustment mechanism for the spindle motor and pickup head of optical disk drives of the invention.

Refer to FIG. 5 for a third embodiment of the deviation adjustment mechanism of the invention. The difference of this embodiment from the first embodiment is that the elastic element 60 in FIG. 3 is replaced by an elastic reed 61 located on an opposite side of the adjusting member 70 to press the motor holding seat 50, so that the motor holding seat 50 is moved in the Z-axis direction in normal condition.

By changing the position of the adjusting member 70, to move the retaining flange 54, the entire motor holding seat 50 may be moved in the Z-axis direction thereby adjusting the deviation of the spindle motor and the pickup head of the optical disk driver.

Figure 6:
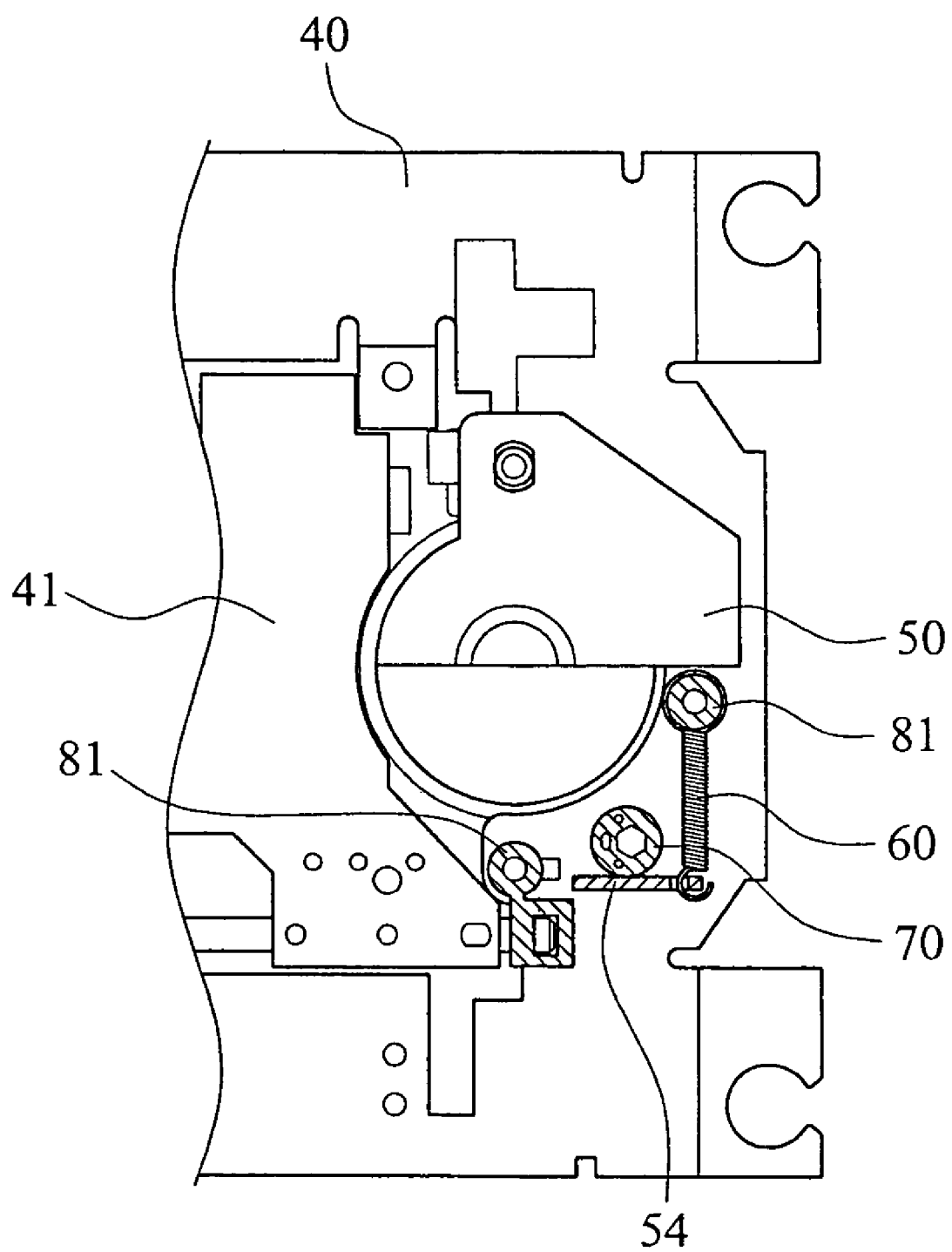
FIG. 6 is a top view of a fourth embodiment of the deviation adjustment mechanism for the spindle motor and pickup head of optical disk drives of the invention.

Refer to FIG. 6 for a fourth embodiment of the deviation adjustment mechanism of the invention. The difference of this embodiment from the first embodiment is that the anchor strut 81 for holding one end of the elastic element 60 is altered. The elastic element 60 has another end latched on the retaining flange 54 so that the motor holding seat 50 may be moved in the Z-axis direction in normal condition.

Similarly, by changing the position of the adjusting member 70, to move the retaining flange 54, the entire motor holding seat 50 may be moved in the Z-axis direction, thereby adjusting the deviation of the spindle motor and the pickup head of the optical disk driver.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A deviation adjustment mechanism for spindle motor and pickup head of optical disk drives to adjust a deviation between a spindle motor and a pickup head of an optical disk drive, comprising:

an optical disk drive dock for holding the pickup head;

a motor holding seat for holding the spindle motor being movably mounted onto the optical disk drive dock and including a retaining flange;

an elastic element having one end fastened to the optical disk drive dock and the other end fastened to the motor holding seat to generate an action force to constantly pull the motor holding seat towards the optical disk drive dock in a first axis direction coaxial to the elastic element;

an adjusting member movably located on the optical disk drive dock corresponding to the retaining flange, the adjusting member in contact with the retaining flange such that when the position of the adjusting member is changed the adjusting member causes the retaining flange to move so as to alter the relative position of the motor holding seat and the optical disk drive dock in the first axis direction; and an anchor member connecting the motor holding seat and the optical disk drive dock to fix the relative position of the motor holding seat and the optical disk drive dock.

2. The deviation adjustment mechanism of claim 1, wherein the anchor member includes:

a plurality of anchor struts located on the optical disk drive dock; and a plurality of fastening bores formed on the motor holding seat corresponding to the anchor struts, the fastening bores and the anchor struts being connected by coupling members to anchor the motor holding seat on the optical disk drive dock.

3. The deviation adjustment mechanism of claim 2, wherein the fastening bores are slots.

4. The deviation adjustment mechanism of claim 2, wherein the coupling members are screws.

5. The deviation adjustment mechanism of claim 1, wherein the adjusting member is a cam having an eccentric hole.

6. The deviation adjustment mechanism of claim 1, wherein the adjusting member is a screw.

7. The deviation adjustment mechanism of claim 1, wherein the elastic element is a spring.

8. The deviation adjustment mechanism of claim 1, wherein the elastic element is an elastic reed.

9. The deviation adjustment mechanism of claim 1, wherein the motor holding seat includes a latch section to couple with one end of the elastic element for connecting the motor holding seat.

* * * * *